United States Patent
Fujisaki et al.

(10) Patent No.: US 7,144,687 B2
(45) Date of Patent: Dec. 5, 2006

(54) MANUFACTURING METHOD FOR MAGNETIC HEAD SUSPENSION

(75) Inventors: Hidehiko Fujisaki, Kanagawa (JP); Kinnosuke Satou, Kanagawa (JP); Osamu Takahashi, Kanagawa (JP)

(73) Assignee: TDK Corporation, Tokyo (JP)

(*) Notice: Subject to any disclaimer, the term of this patent is extended or adjusted under 35 U.S.C. 154(b) by 24 days.

(21) Appl. No.: 10/880,519

(22) Filed: Jul. 1, 2004

(65) Prior Publication Data

US 2005/0037139 A1 Feb. 17, 2005

(51) Int. Cl.
*G03F 7/20* (2006.01)
*G11B 21/21* (2006.01)

(52) U.S. Cl. .................. 430/320; 430/319; 430/396

(58) Field of Classification Search ................ 430/317, 430/319, 320, 396; 29/603.01, 603.03, 603.07, 29/603.12; 360/244.1, 244.2, 244.3
See application file for complete search history.

(56) References Cited

U.S. PATENT DOCUMENTS 6,673,256 B1 1/2004 Takasugi

2003/0007292 A1* 1/2003 Himes et al. ............ 360/245.9

FOREIGN PATENT DOCUMENTS

| JP | 6-28801 | 2/1994 |
| JP | 6-203508 | 7/1994 |
| JP | 9-191004 | 7/1997 |
| JP | A-2000-231710 | 8/2000 |
| JP | A-2000-315868 | 11/2000 |
| JP | 2001-43648 | 2/2001 |
| JP | 2001-350272 A * | 12/2001 |
| JP | 2003-187542 | 7/2003 |

* cited by examiner

*Primary Examiner*—John A. McPherson
(74) *Attorney, Agent, or Firm*—Oblon, Spivak, McClelland, Maier & Neustadt, P.C.

(57) ABSTRACT

A step of forming an insulating resin layer 31 includes a process of forming the insulating resin layer 31 made of a photo-sensitive resin on a load beam or a flexure 11 and an exposing and developing process in which a photo-mask 32 having different light transmittance between a part corresponding to a part near a slider mounting part 22 and other parts is applied to the insulating resin layer 31, exposed and developed so that the thickness of the insulating resin layer 31 of the part near the slider mounting part 22 is smaller than the thickness of the insulating resin layer 31 of other parts.

3 Claims, 5 Drawing Sheets

MANUFACTURING METHOD FOR MAGNETIC HEAD SUSPENSION

BACKGROUND OF THE INVENTION

The present invention relates to a manufacturing method for a suspension for a magnetic head.

As shown in FIG. 9, in the suspension 10 for the magnetic head, a magnetic head element (slider) 12 is mounted on the end side of a load beam 11 made of a spring material such as stainless steel and a wiring pattern 13 electrically connected to the magnetic head element 12 is formed on the load beam 11. The load beam 11 is fixed to an arm part 18 of an actuator 17 through a spacer 14 at one end side thereof to perform a seeking movement (see FIG. 10). FIG. 10 shows a magnetic disk device. Reference numeral 19 designates a spindle and 20 designates a magnetic disk. The wiring pattern 13 is formed on an insulating resin layer 15 made of a polyimide resin, an epoxy resin, an acrylic resin, etc. with a prescribed width on the load beam 11 as shown in FIG. 11. The wiring pattern 13 is further covered with a protective layer 16 made of a photo-sensitive resin, a polyimide resin, an epoxy resin, an acrylic resin, a resist, etc. Externally connecting terminal parts 13a of the wiring pattern 13 are exposed. Further, the parts of the terminal parts of the wiring pattern 13 connected to the magnetic head element 12 are also exposed by forming an opening part (not shown in the drawings) on the protective layer 16.

As shown in FIG. 9, a slider mounting part 22 on which the magnetic head element (slider) 12 is mounted is supported by a traverse beam 24 of a beam shaped support part (generally called a gimbals part) 25 formed substantially in an H-shape by two longitudinal beams 23 and one traverse beam 24. The slider 12 is fixed to the slider mounting part 22 by an adhesive agent. The slider 12 is urged toward a medium side by the resilient force of the load beam 11. When the medium is rotated at high speed upon reading and writing data, the slider slightly floats at a position where a wind force from the medium balances the resilient force of the load beam 11. Accordingly, the load beam 11 needs a part having a resiliency and a part having rigidity capable of preventing a deformation due to torsion. The resiliency is obtained by a part 11a called an R bend. The rigidity is obtained by forming, for instance, a bent and folded part 11b in the load beam 11. The gimbals part 25 is not limited to the above-described structure, however, requires a prescribed degree of freedom.

Nowadays, as the medium has a high density, the magnetic head element (slider) 12 is miniaturized and the suspension 10 for supporting the slider 12 is also apt to be progressively miniaturized. Accordingly, as a resilient metallic material that forms the load beam 11, for instance, a thin stainless steel material having the thickness of about 25 μm or the like has been used. The adjustment of floating characteristics (resilient pressure, rigidity) reaches a limit depending on the above-described bending work. On the other hand, an impedance of the suspension 10 side to an external connecting part thereof needs to be adjusted. To adjust the impedance to the external connecting side, the thickness of the insulating resin layer 15 on the load beam 11 needs to be increased.

As described above, the thickness of the insulating resin layer 15 is increased so that the rigidity is increased, and the resilient pressure or the torsion can be prevented conveniently in this respect. However, the rigidity of the gimbals part 25 in the vicinity of the slider mounting part 22 conversely becomes too high, so that the degree of freedom is undesirably the more lowered. Thus, recently, the thickness of the insulating resin layer 15 near the slider mounting part 22 is smaller than that of other parts to ensure the degree of freedom of the gimbals part 25.

To make the insulating resin layer 15 in the vicinity of the slider mounting part 22 thinner than other parts, such a manufacturing method as described below has been usually employed. That is, as shown in FIG. 12, a first insulating resin layer 26 is firstly applied to the load beam 11. Then, a photo-resist layer (not shown) is formed on the first insulating resin layer 26, exposed and developed to form a photo-mask 27 (see FIG. 13). An etching process is carried out by using this photo-mask 27 as a mask to form a prescribed pattern on the first insulating layer 26 (see FIG. 14). After the photo-mask 27 is removed, the first insulating resin layer 26 is coated and applied with a second insulating resin layer 28, as shown in FIG. 15. Then, a photo-resist layer (not shown) is formed on the second insulating resin layer 28, exposed and developed to form a photo-mask 29 (see FIG. 16). An etching process is carried out by using the photo-mask 29 as a mask to leave the second insulating resin layer 28 (see FIG. 17) on the first insulating resin layer 26 in a part from which the gimbals part 25 is removed. In such a way, since only the first thin insulating resin layer 26 is formed on the gimbals part 25, the rigidity is not increased too much to ensure a necessary degree of freedom.

However, the above-described related art has such a problem as described below. That is, two film forming processes of forming the first insulating resin layer 26 and the second insulating resin layer 28 are necessary so that the number of processes is undesirably increased and a cost is inconveniently increased.

SUMMARY OF THE INVENTION

Accordingly, the present invention is proposed to solve the above-described problem and it is an object of the present invention to provide a manufacturing method for a suspension for a magnetic head in which the thickness of an insulating resin layer can be adjusted without increasing the number of processes and a cost can be reduced.

To achieve the above-described object, a manufacturing method for a suspension for a magnetic head according to the present invention comprises the steps of forming an insulating resin layer on a load beam or a flexure of a suspension having the load beam or the flexure made of a resilient metal plate and a slider mounting part formed in the end side of the load beam or the flexure; forming a wiring pattern on the insulating resin layer and forming a protective layer by covering the wiring pattern. The step of forming the insulating resin layer includes a process of forming the insulating resin layer made of a photo-sensitive resin on the load beam or the flexure and an exposing and developing process in which a photo-mask having different light transmittance between a part corresponding to a part near the slider mounting part and other parts is applied to the insulating resin layer, exposed and developed so that the thickness of the insulating resin layer of the part near the slider mounting part is smaller than the thickness of the insulating resin layer of other parts.

A negative type photo-sensitive resin is preferably used for the photo-sensitive resin. A photo-mask having a grid shaped or slit shaped opening part which is provided in a light-proof film corresponding to the part near the slider mounting part so that the light transmittance is adjusted to be different from that of other parts is preferably employed as the photo-mask. Further, the part near the slider mounting part is a gimbals part.

Further, a manufacturing method for a suspension for a magnetic head comprises the steps of forming an insulating resin layer on a load beam or a flexure of a suspension having the load beam or the flexure made of a resilient metal plate and a slider mounting part formed in the end side of the load beam or the flexure; forming a wiring pattern on the insulating resin layer and forming a protective layer by covering the wiring pattern. The step of forming the insulating resin layer includes a process of forming the insulating resin layer on the load beam or the flexure, a process of applying a photo-sensitive resist on the insulating resin layer, a process of exposing and developing the photo-sensitive resist to form an etching mask having a grid shaped or slit shaped opening part in a part corresponding to a part near the slider mounting part, an etching process of etching the insulating resin layer by using the etching mask as a mask so that the thickness of the insulating resin layer of the part near the slider mounting part is smaller than the thickness of other parts and a process of removing the etching mask. The part near the slider mounting part is the gimbals part.

DETAILED DESCRIPTION OF THE PREFERRED EMBODIMENTS

Now, preferred embodiments of the present invention will be described below in detail by referring to the accompanying drawings.

(First Embodiment)

Figure 1:
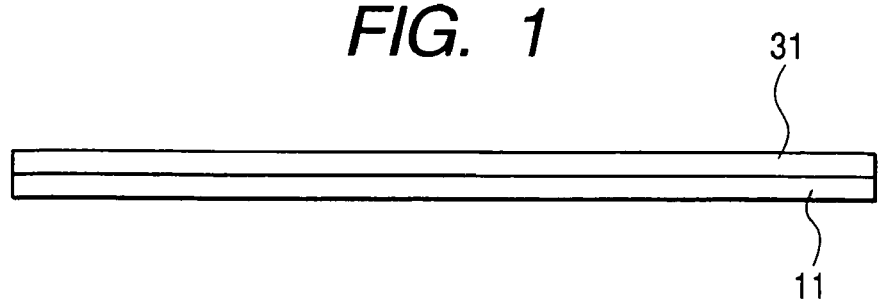
FIG. 1 is an explanatory view showing a state that an insulating resin layer is formed in a first embodiment.

FIGS. 1 to 5 show a first embodiment. As shown in FIG. 1, an insulating resin layer 31 made of a photo-sensitive resin having a prescribed thickness (for instance, 25 to 30 μm) is formed on a load beam 11. As the photo-sensitive resin, a polyimide resin, an epoxy resin, an acrylic resin, etc. may be preferably used. As a suspension for a magnetic head, a two-piece type in which a flexure serves as a load beam is well-known. In this case, the insulating resin layer 31 is formed on the flexure. Accordingly, in this embodiment, the load beam or the flexure is referred to. However, the load beam is explained below as an example.

Figure 2:
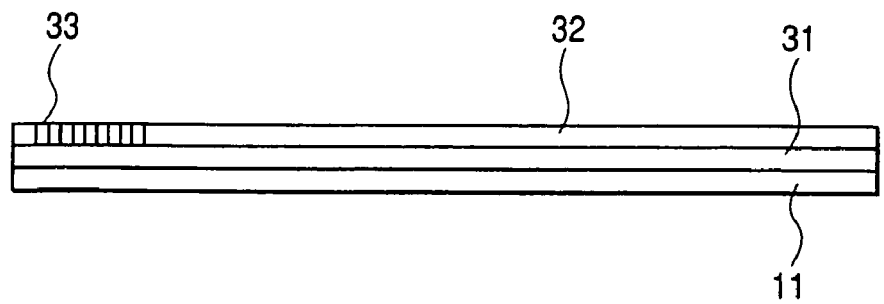
FIG. 2 is an explanatory view showing a state that a photo-mask is formed.

As shown in FIG. 2, a photo-mask 32 is applied to the insulating resin layer 31 and exposed. The photo-mask 32 has a light-proof film made of a chromium film on a transparent base material made of glass. On a part of the light-proof film, slits 33 having a prescribed width (several μm) are formed in parallel at prescribed intervals (several μm), so that a light transmittance relative to other parts is adjusted. The part in which the slits 33 are provided is a part including at least a gimbals part 25 in the vicinity of a slider mounting part 22 in the load beam 11. In parts corresponding to other parts, the light-proof film is removed by a prescribed pattern.

Figure 3:
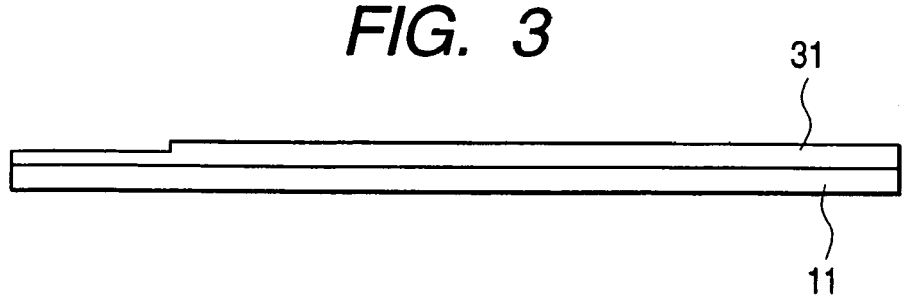
FIG. 3 is an explanatory view showing a state that the thickness of the insulating resin layer is adjusted.
Figure 4:
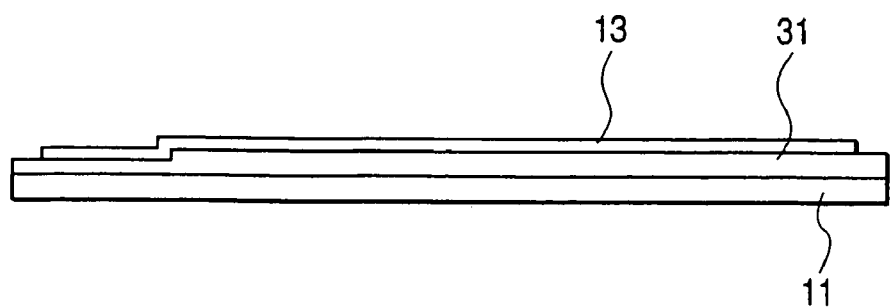
FIG. 4 is an explanatory view showing a state that a wiring pattern is formed.
Figure 5:
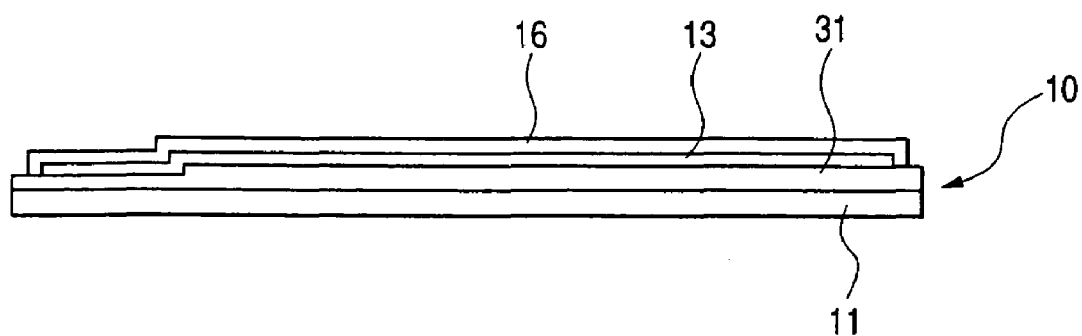
FIG. 5 is an explanatory view showing a state that a protective layer is formed.

The insulating resin layer 31 of an exposed part is solidified and left by a developing process and the insulating resin layer 31 of a non-exposed part is removed. The exposure of the part in which the slits 33 are formed is not complete (a semi-exposed part). Accordingly, the insulating resin layer 31 of this part is partly removed to remain thin by the developing process as shown in FIG. 3. For instance, the thickness of the insulating resin layer 31 of this part can be adjusted to the thickness of about 10 μm and a degree of freedom of the gimbals part 25 can be assured. In this case, a grid type small opening part (not shown in the drawing) may be provided in place of the slits 33 to adjust the light transmittance. Further, it is to be understood that not a negative type photo-sensitive resin, but a positive type photo-sensitive resin may be used. The photo-mask 32 whose light transmittance is adjusted as described above is used so that the degree of exposure of the insulating resin layer 31 can be adjusted. Since the thickness of the insulating resin layer 31 can be adjusted by the same exposing and developing process, the number of processes is not increased and a cost can be reduced. Further, after the exposing and developing process, a heat treatment (a curing process) is carried out to completely solidify the insulating resin layer 31.

Table 1 shows the thickness of the insulating resin layer 31 of a complete exposure part and the semi-exposure part when the insulating resin layer 31 is formed under various kinds of conditions. L/S indicates a relation between the slit having the width of S (μm) and a space L (μm) between the slits in the part (the semi-exposure part) in which the slits 33 are provided in the photo-mask 32 to adjust the light transmittance. In this embodiment, the photo-mask 32 in which L and S have the same width to adjust the transmittance to 50% was used in any of the examples. The (complete) exposure part is a part in which the light-proof film is completely removed. Further, intensity indicates the intensity of exposure light (UV).

TABLE 1

| | | | L/S (μm) | | | |
|---|---|---|---|---|---|---|
| | | | 6/6 μm | 5/5 μm | 4/4 μm | 3/3 μm |
| intensity | 1300 mj | exposure part | 5.93 | 6.16 | 6.33 | 5.86 |
| | | semi-exposure part | 2.10 (35.4%) | 1.70 (27.6%) | 1.08 (17.1%) | 0.02 (0.3%) |
| | 1500 mj | exposure part | 6.45 | 6.51 | 6.20 | 6.79 |
| | | semi-exposure part | 3.72 (57.7%) | 3.12 (47.9%) | 2.04 (32.9%) | 1.65 (24.3) |

As understood from the Table 1, the intensity of the exposure light or the width of the slit 33 is selected so that the thickness of the film of the semi-exposure part can be adjusted to about 0.3 to 60% as large as the thickness of the film of the insulating resin layer 31 of the complete exposure part. Further, as recognized from the Table, even if the light transmittance is the same, that is 50%, in the photo-mask 32, when the width of the slit becomes smaller, light hardly turns so that a photosensitivity is lowered. It is to be understood that the photosensitivity changes depending on the material of the photo-sensitive resin.

On the insulating resin layer 31 formed as described above, a wiring pattern 13 is formed (see FIG. 4) by an ordinary method. Further, a protective layer 16 for covering the wiring pattern 13 is formed in accordance with an ordinary method. Thus, a suspension 10 for a magnetic head can be formed (see FIG. 5).

For instance, the wiring pattern 13 can be formed by below-described processes. Specifically, on the insulating resin layer 31, chromium and copper are sequentially sputtered to form a connecting metallic layer (not shown). A photo-sensitive resist (not shown) is applied to the connecting metallic layer, exposed and developed to form a resist pattern in which the connecting metallic layer is exposed in the same manner as the pattern of the wiring pattern 13. The resist pattern is used as a mask and the connecting metallic layer is used as a feeder layer. Then, an electrolytic copper plating, an electrolytic nickel plating and an electrolytic gold plating are carried out in order to form the wiring pattern 13. Then, the resist pattern is removed and the exposed connecting metallic layer is removed by etching. Otherwise, a copper foil (not shown) may be simply thermally compressed and bonded to the insulating resin layer 31 and the copper foil may be etched to form the wiring pattern 13.

Further, the protective layer 16 can be formed in accordance with, for instance, following processes. Specifically, a photo-sensitive resin (not shown) is applied to cover the wiring pattern 13 therewith. The photo-sensitive resin is exposed, developed and cured so that the protective layer 16 can be formed. As the photo-sensitive resin for the protective layer, resins including a polyimide resin, an epoxy resin, an acrylic resin, a resist, etc. may be used.

The above-described suspension 10 is preferably manufactured in such a way that many suspensions are formed at the same time as described above on a long stainless steel plate or a stainless steel plate having a prescribed size and pieces of suspensions 10 are finally separated.

(Second Embodiment)

Figure 6:
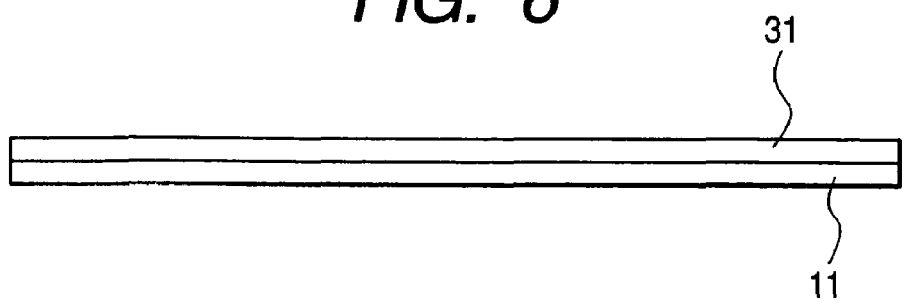
FIG. 6 is an explanatory view showing a state that an insulating resin layer is formed in a second embodiment.
Figure 7:
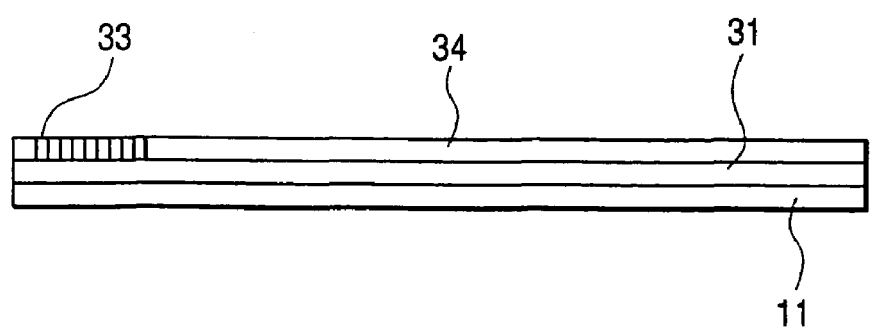
FIG. 7 is an explanatory view showing a state that an etching mask is formed.
Figure 8:
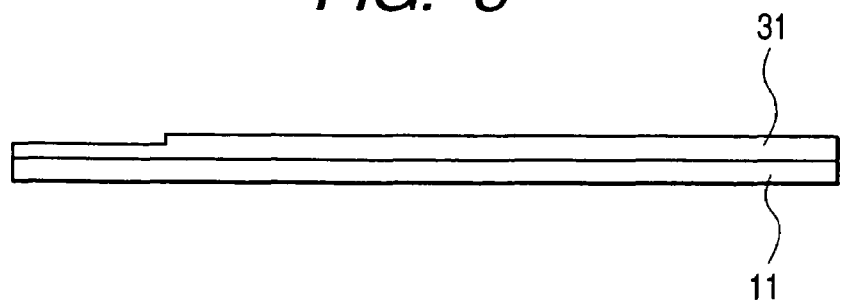
FIG. 8 is an explanatory view showing a state that the thickness of the insulating resin layer is adjusted.
Figure 9:
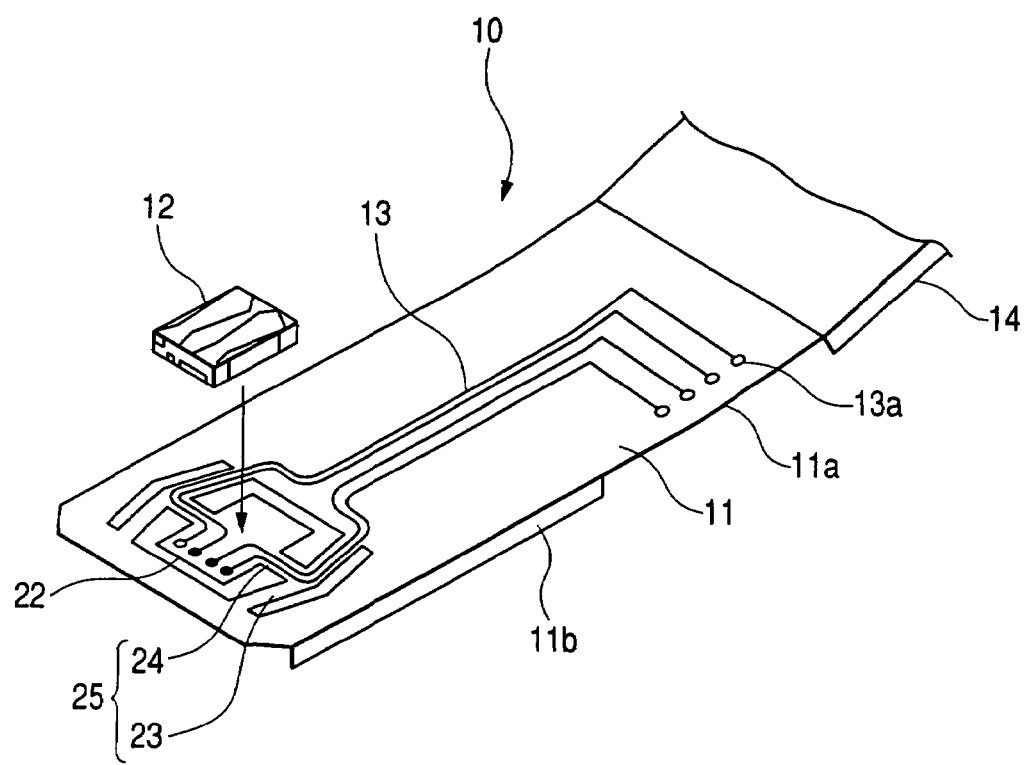
FIG. 9 is an explanatory view of a suspension.
Figure 10:
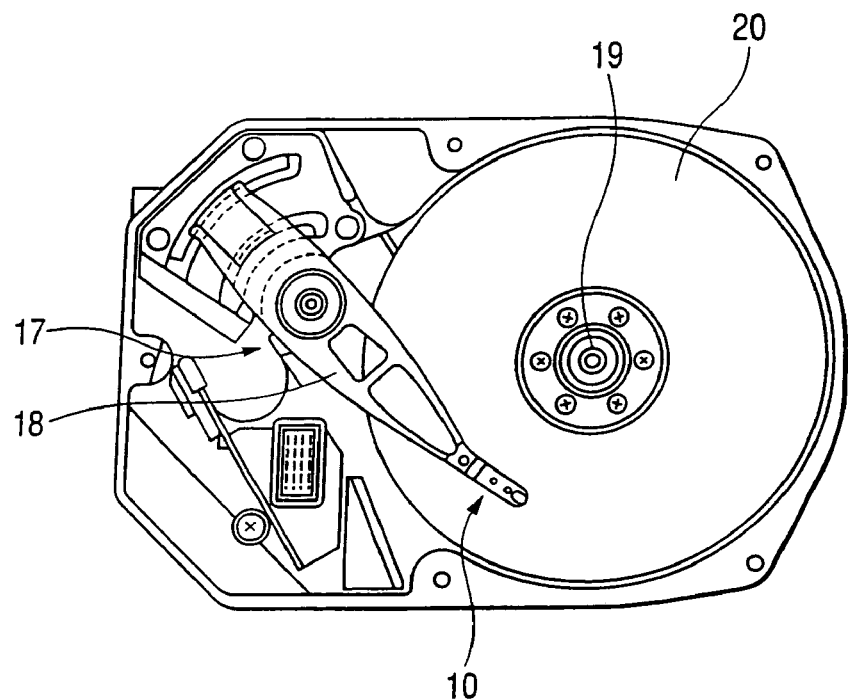
FIG. 10 is an explanatory view of a magnetic disk device.
Figure 11:
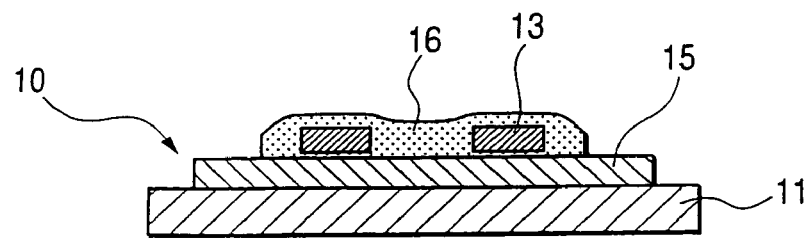
FIG. 11 is a sectional view of the suspension.
Figure 12:
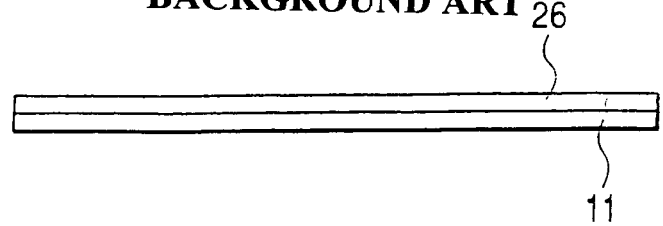
FIG. 12 is a usual method for adjusting the thickness of an insulating resin layer and an explanatory view showing a state that a first insulating resin layer is formed.
Figure 13:
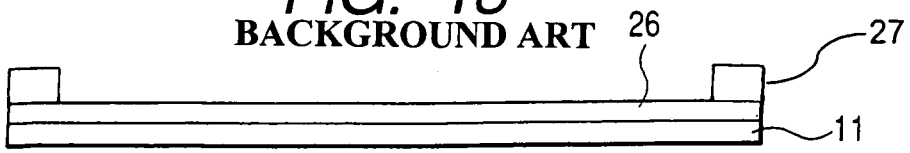
FIG. 13 is an explanatory view showing a state that a photo-mask is formed.
Figure 14:
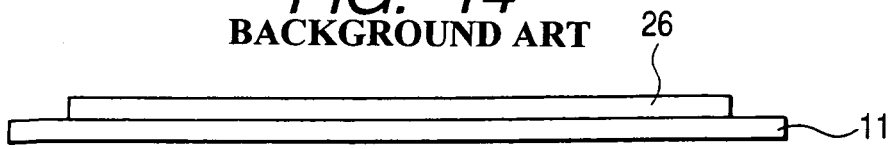
FIG. 14 is an explanatory view sowing a state that the first insulating resin layer is patterned.
Figure 15:
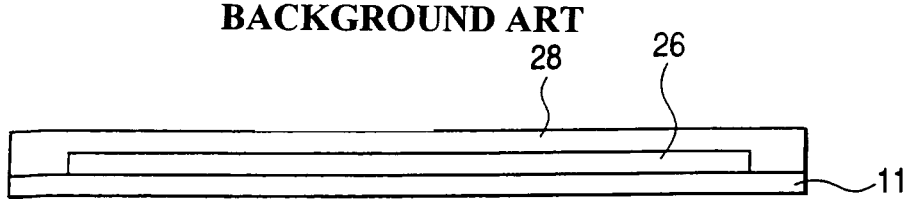
FIG. 15 is an explanatory view showing a state that a second insulating layer is formed.
Figure 16:
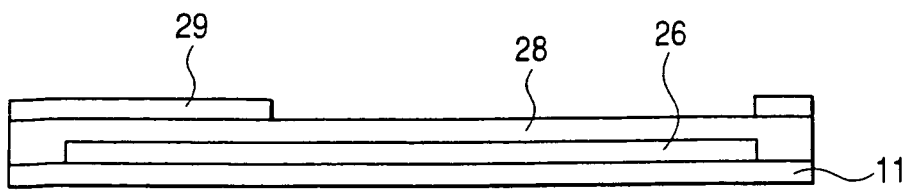
FIG. 16 is an explanatory view showing a state that a photo-mask is formed.
Figure 17:
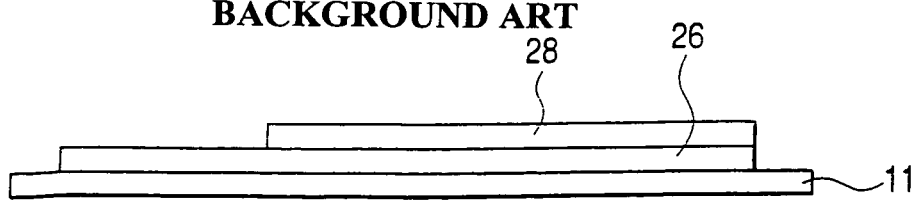
FIG. 17 is an explanatory view showing a state that the second insulating resin layer is patterned.

FIGS. 6 to 8 show a second embodiment of a method for forming the insulating resin layer 31. Firstly, as shown in FIG. 6, a non-photo-sensitive resin is applied to a load beam 11 to form an insulating resin layer 31. Then, as shown in FIG. 7, a photo-sensitive resist is applied to the insulating resin layer 31. The photo-sensitive resist is exposed and developed to form an etching mask 34. On the etching mask 34, slits 33 having a prescribed width (several μm) are partly formed in parallel at prescribed intervals (several μm) to adjust a light transmittance relative to other parts. The part having the slits 33 provided is a part including at least a gimbals part 25 in the vicinity of a slider mounting part 22 in the load beam 11. In parts corresponding to other parts, the resist is left as it is.

The insulating resin layer 31 is subjected to an etching process by using the etching mask 34 as a mask. As the etching process, any of processing methods such as an etching by etching liquid, a plasma etching, an etching process by RIE may be employed. As shown in FIG. 8, the front surface side of the insulating resin layer 31 in an area in which the slits 33 are provided is removed to be thinner than other parts. The resist having a prescribed width is left between the slit 33 and the slit 33. However, the etching liquid is turned to a back surface. Thus, while slight irregularities remain on the front surface, all the area in which the slits 33 are provided becomes thin. Accordingly, in this embodiment, the thickness of the insulating resin layer 31 can be adjusted in the same process, the number of processes is not increased and a cost can be reduced. A grid type small opening part may be provided in place of the slits 33. The etching mask 34 is removed so that a wiring pattern 13 and a protective layer 16 are formed in the same manner as that of FIGS. 4 and 5 to complete a suspension 10. In the first and second embodiments, the gimbals part 25 is formed integrally with the load beam 11. However, the gimbals part may be formed separately from the load beam and fixed to the load beam 11.

As described above, according to the present invention, the thickness of the insulating resin layer can be adjusted without increasing the number of processes and the cost can be reduced.

What is claimed is:

1. A manufacturing method for a suspension for a magnetic head comprising the steps of:

forming an insulating resin layer on a load beam or a flexure of a suspension having the load beam or the flexure made of a resilient metal plate and a slider mounting part formed in an end side of the load beam or the flexure;

forming a wiring pattern on the insulating resin layer; and forming a protective layer by covering the wiring pattern, wherein the step of forming the insulating resin layer includes:

a process of forming the insulating resin layer made of a photo-sensitive resin on the load beam or the flexure; and an exposing and developing process in which a photo-mask having different light transmittance between a part corresponding to a part near the slider mounting part and other parts is applied to the insulating resin layer, exposed and developed so that the thickness of the insulating resin layer at the slider mounting part on the load beam or the flexure is smaller than the thickness of the insulating resin layer of other parts, the insulating resin layer at the slider mounting part functioning to adjust rigidity of the load beam or the flexure.

2. A manufacturing method for a suspension for a magnetic head according to claim 1, wherein a negative type photo-sensitive resin is used for the photo-sensitive resin, and a photo-mask having a grid shaped or slit shaped opening part which is provided in a light-proof film corresponding to the part near the slider mounting part so that the light transmittance is adjusted to be different from that of other parts is employed as the photo-mask.

3. A manufacturing method for a suspension for a magnetic head according to claim 1 or 2, wherein the part near the slider mounting part is a gimbals part.

* * * * *